Patented Nov. 10, 1953

2,658,829

UNITED STATES PATENT OFFICE 2,658,829

PROCESS OF CLARIFYING AND STABILIZING BEER

John Vincent MacDonough, Watertown, Mass.

No Drawing. Application April 19, 1952,
Serial No. 283,249

4 Claims. (Cl. 99—48)

This invention relates to a process of treating beer and ale and the like fermented malt beverages, herein collectively referred to as "beer," and has for its object to stabilize beer by eliminating the causes of cloudiness and turbidity therein without materially lowering the sigma value of the foam.

In the brewing and finishing of beer the aim of the brewer is to obtain a produce which is brilliantly clear and transparent and which will so remain under all conditions of subsequent handling including storage at temperatures down to 32° F. It is generally recognized that beer is rendered turbid or cloudy on standing, particularly in the cold by reason of the precipitation of nitrogenous or protein bodies. In the process of mashing the grain and making the wort which is subsequently fermented, a portion of the nitrogenous bodies (protein substances) of the grain is brought into solution. After the fermentation and the aging or "lagering" to which the new beer is subjected, some of the nitrogenous bodies are precipitated and are removed by filtration. After the final filtration the beer or ale is brilliant, but upon storage in the case of draught beer and upon pasteurization and storage in the case of bottled beer, it gradually becomes cloudy and finally turbid especially at 32° F.

Several methods have been suggested for overcoming this turbidity, one of which involves the removal of the objectionable nitrogenous bodies still held in the lagered beer while in ruh storage, which bodies are susceptible to subsequent precipitation and subsequent separation as disclosed in the United States Patent to Ash, No. 1,234,255. This method has not proved practical, due to the extremely finely divided condition of the protein tannate precipitate which settles slowly and is extremely difficult to filter out.

A second method has yielded results of more or less value and is accomplished by adding to the beer substance proteolytic enzymes, which have the power of rendering these insoluble nitrogenous bodies soluble and hence the beer remains brilliant. The process is known as "chillproofing" or "stabilizing" and in general employs the process and variations suggested by Wallerstein and Melton (U. S. Patents Nos. 2,077,446, 2,077,447, and 2,088,712). There is, however, an objectionable feature which is thought by some to be attributable to the enzymatic treatment, namely, the lowering of the sigma value of the foam, otherwise known as reducing the head.

Other methods involve the use of various materials such as bentonite, hydrosulfites, and silicates, but as far as I am aware such methods have not proved sufficiently satisfactory to displace the enzymatic treatment which presently constitutes the general practice.

A further difficulty encountered in the production of bottled beer is the prevention of a cooked or "pasteurized" taste which is imparted to the beer and the darkening of the color of the beer following pasteurization. The heat of pasteurization, especially when there are traces of air in the beer, is sufficient to impart a more or less pronounced cooked taste in the bottle which progressively increases during storage. Pasteurization also develops color in bottled beer, which increases progressively during storage; and chillproofing as now practiced does not prevent the change in color or the acquisition of a cooked taste in the bottled beer.

I have discovered that if beer, at any stage after fermentation, is treated with relatively small amounts of a mixture of either Irish moss or an Irish moss extractive, tannic acid or a soluble tannate, and a reducing agent such as sulfurous acid or a soluble sulfite, the nitrogenous bodies responsible for the cloudiness or turbidity are precipitated out so that ordinary filtering removes them completely, without material lowering of the sigma value of the foam. The action of these three ingredients appears to be synergistic since none alone gives satisfactory results, nor does any combination of two of them; but all three act conjointly to produce the desired result within a relatively short time and at a cost substantially lower than any process heretofore known to me.

In addition to the elimination of the nitrogenous bodies which cause cloudines and turbidity, I prevent at the same time the development of a cooked taste and a darkening of the color in beer that is pasteurized. My process also gives a lighter colored beer than one treated by enzymes coupled with sodium bisulfite.

In accordance with the present invention there is incorporated in the fermented beer at any stage before final filtration a mixture consisting essentially of Irish moss, which may vary from a minimum of the order of 10 milligrams to a maximum which may exceed 300 milligrams per liter of beer, a compound selected from the group consisting of tannic acid and water-soluble tannates which may vary from a minimum of the order of 10 milligrams to a maximum of the order of 100 milligrams per liter of beer, and a non-toxic reducing agent such as sodium or potassium sulfite or bisulfite which may vary from a minimum of the order of 5 milligrams to a maximum of the order of 50 milligrams per liter of beer, thereby to effect on standing a precipitation of the above-mentioned nitrogenous bodies which are removed by decantation, filtration or other methods. In place of Irish moss I may use an Irish moss extractive, one pound of which is the equivalent of approximately three pounds of natural bleached Irish moss.

In the practice of my process, I can proceed at any stage of the brewing process after the beer has reached the fermenting cellar. I prefer, however, to institute the treatment at the time the beer is carbonated or after it has been in ruh storage for about one week at a temperature of 32° F. The preferred treatment consists essentially in adding to the agitated storage or krausened beer 70 to 140 milligrams of Irish moss per liter of beer in the form of a 0.5% solution in water, and from 25 to 80 milligrams of tannic acid or its equivalent in the form of a water soluble salt of tannic acid per liter of beer, and from 15 to 50 milligrams of sulfurous acid, or its equivalent, in the form of a salt of sulfurous acid per liter of beer; then agitating the mixture thoroughly and then allowing it to stand at rest until the desired chemical and physical action has taken place, which in practice is about five days. The beer may be allowed to stand for as many days thereafter as desired.

The chemical action which takes place produces a precipitation of the slightly soluble nitrogenous bodies which would be very slowly precipitated by any subsequent cooling or heating to which the finished beer might be subjected. These precipitated nitrogenous bodies are deposited on the bottom of the tank in which the beer is held. This deposition is very greatly accelerated and the whole process is thereby made practical by the peculiar action of the agglutinated constituents of the Irish moss. The beer is finally carbonated and filtered clear and brilliant. My process, therefore, removes the nitrogenous bodies which give the trouble, rather than treat them so that they will remain in solution as is done in the present chill-proofing processes involving enzymatic action.

The beer produced in the above manner is lighter in color, does not become discolored when pasteurized, and does not undergo material lowering of the sigma value of the foam. It has been found that beer so treated is relatively free from objectionable nitrogenous matter so that the bottled beer when frozen solid and subsequently thawed out remains brilliant, retains its original color, and does not acquire a cooked or pasteurized taste. Bottle beer so treated has remained brilliant for over four months when held at a temperature of 32° F.

An example of what is now considered a preferred procedure is as follows:

One hundred and thirty barrels of ruh beer was filtered after having been in ruh storage at 32° F. for ten days and was then run into cold storage at 32° F. The agitator was started and 57 gallons of Irish moss solution was injected into the beer. The irish moss solution was made by soaking 2.4 pounds of Irish moss in cold water for five hours and then heating in a double boiler for thirty minutes between 150° F. and 200° F. The resulting liquid was filtered through fine cheese cloth.

With the beer still being agitated, eleven gallons of a solution of tannic acid and sodium bisulfite were added to the beer. This solution was made by dissolving 13.7 ounces of sodium bisulfite in eleven gallons of cold water, after which 13.7 ounces of tannic acid were added and stirred until it was completely dissolved. The beer was stirred for thirty minutes longer after all the above ingredients had been added, and was then allowed to rest for seven days, after which it was carbonated and filtered.

Although the foregoing example shows one way for carrying out my process, it is to be understood that the above sequence, quantities and times are merely illustrative. It has been found that the ingredients may be added to ruh beer which has not been filtered with equally good results; the tannic acid and sulfite solution may be added before the Irish moss solution with good results, and greater or smaller quantities than those specified may be added with good results; and the beer may be finally filtered twenty-four hours after the above treatment.

I am aware that Irish moss has been used in brewing for years, but it has always been added to the wort in the kettle, and when so added it has no effect on the beer after fermentation. Its behavior in cold, fermented beer is distinctly different than in hot or cold wort. Irish moss added in the kettle will have no subsequent effect on the tannic acid sulfite mixture added after fermentation.

I claim:

1. The process of treating beer which consists essentially in treating the fermented beer with a mixture of from 10 to 300 milligrams of Irish moss per liter of beer, from 10 to 100 milligrams of a compound selected from the group consisting of tannic acid and tannic acid salts, and from 5 to 50 milligrams of a reducing agent, thereby to produce a precipitate and thereafter removing the resulting precipitate.

2. The process of stabilizing beer which consists in treating fermented beer with about 70-140 milligrams of Irish moss per liter of beer and about 25-80 milligrams of a compound selected from the group consisting of tannic acid and tannic acid salts, and about 25-50 milligrams of a compound selected from the group consisting of sulfurous acid and sulfites, permitting the treated beer to stand so as to effect precipitation of nitrogenous bodies, and removing the precipitate.

3. In the process of treating beer, the step which comprises incorporating in the beer, after fermentation, an aqueous solution of Irish moss.

4. The process of treating beer which consists essentially in incorporating in the fermented beer a mixture of from 70 to 140 milligrams of Irish moss, from 25 to 80 milligrams of tannic acid, and from 25 to 50 milligrams of sodium bisulfite per liter of beer, permitting the beer to stand until a precipitate has formed, and thereafter filtering the beer.

JOHN VINCENT MacDONOUGH.

References Cited in the file of this patent

UNITED STATES PATENTS

| Number | Name | Date |
|---|---|---|
| 1,234,255 | Ash | July 24, 1917 |
| 1,724,021 | Heuser | Aug. 13, 1929 |
| 2,159,167 | Lilienfeld | May 23, 1939 |